Aug. 11, 1925.

J. A. SMITHLINE

ANIMAL DEN

Filed Aug. 14, 1923

1,549,229

2 Sheets-Sheet 1

Inventor

John A. Smithline

By Bacon & Thomas

Attorneys

Aug. 11, 1925. 1,549,229
J. A. SMITHLINE
ANIMAL DEN
Filed Aug. 14, 1923 2 Sheets-Sheet 2
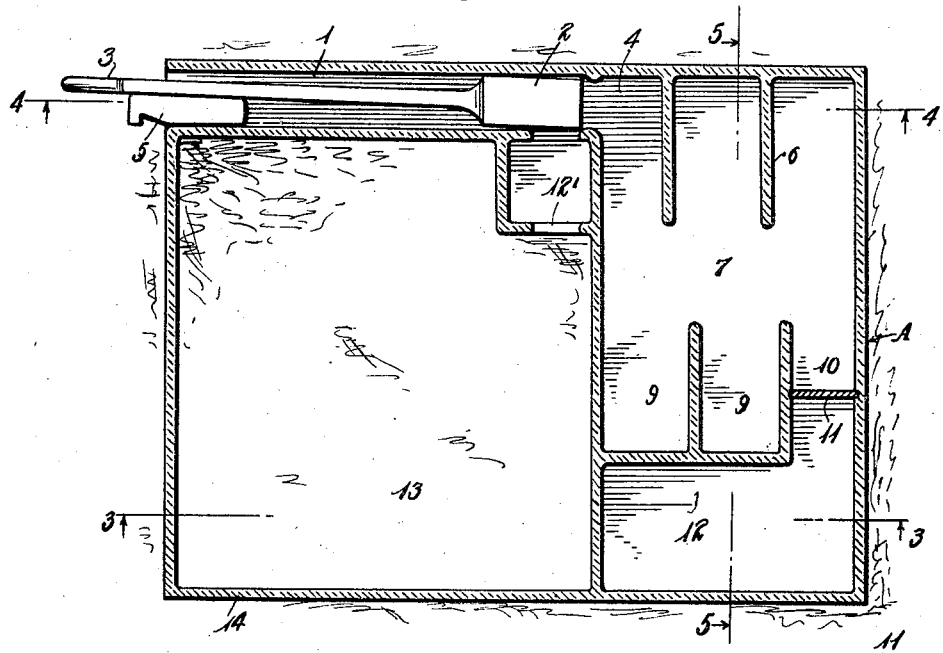
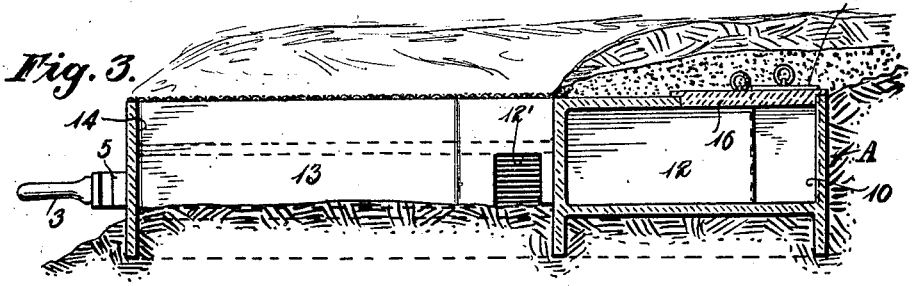
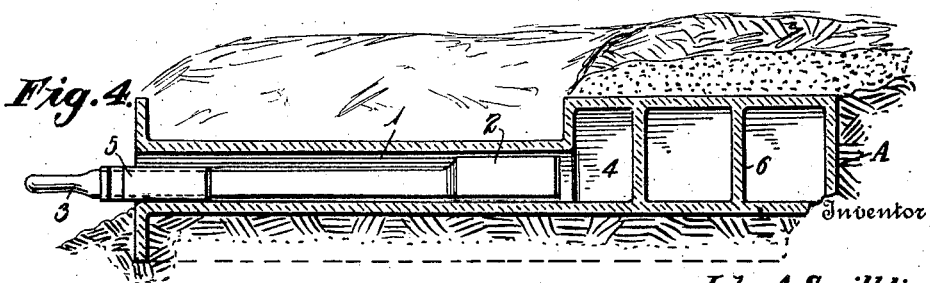
Inventor
John A. Smithline
By Bacon Thomas
Attorneys Patented Aug. 11, 1925.

1,549,229

UNITED STATES PATENT OFFICE.

JOHN A. SMITHLINE, OF LOCKRIDGE, IOWA.

ANIMAL DEN.

Application filed August 14, 1923. Serial No. 657,414.

*To all whom it may concern:*

Be it known that I, JOHN A. SMITHLINE, a citizen of the United States, residing at Lockridge, in the county of Jefferson and State of Iowa, have invented certain new and useful Improvements in Animal Dens, of which the following is a specification.

The invention relates to improvements in animal dens.

It is an object of the invention to provide a breeding den for skunks or like animals where said animals are housed without being molested and where they will thrive, the den being provided with convenient means for admitting the animals thereto or removing them from the compartments in the den.

The invention further comprises an animal den which is adapted to be embedded in the earth and having its surface covered with earth or the like so that the animals can be housed in a location where they are not molested by noises or harmed by other animals and each den is protected against flooding waters by reason of the fact that it is so positioned that the water drains from the compartments therein.

It is a further object of the invention to provide an animal den of this general character wherein such wild animals as skunks or the like can be propagated while maintained in captivity without danger of injury thereto, which den consists of certain compartments, one of which is provided with cells, while the other is an elongated compartment having no cells, the den construction being so arranged that the animals from either the elongated compartment or the cells may freely pass to a communicating outhouse construction.

Figure 1:
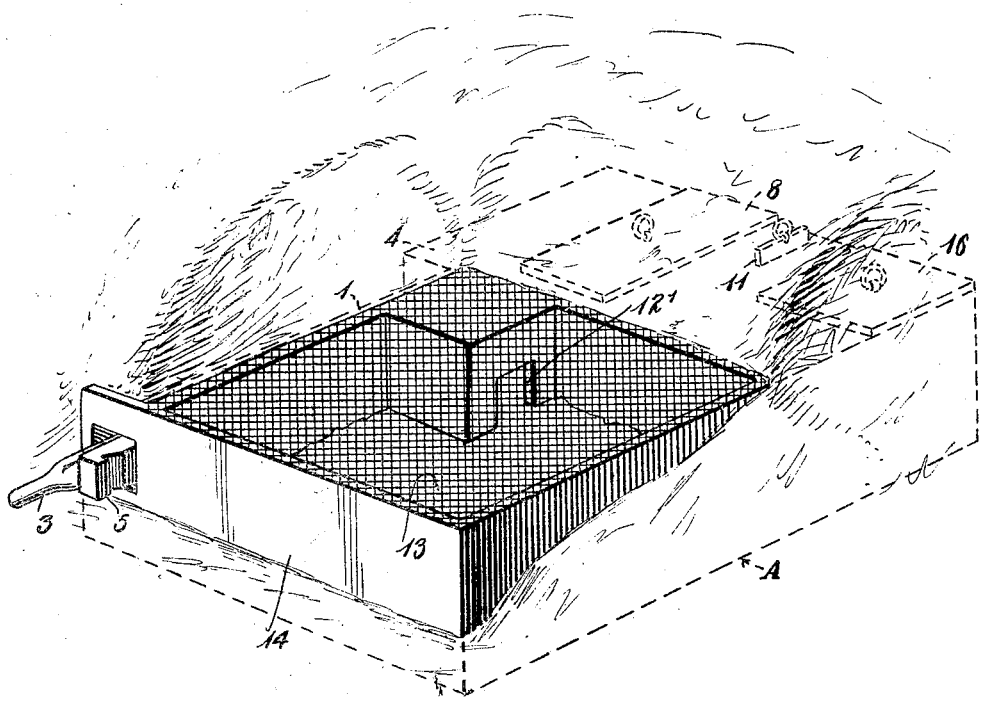
Figure 5:
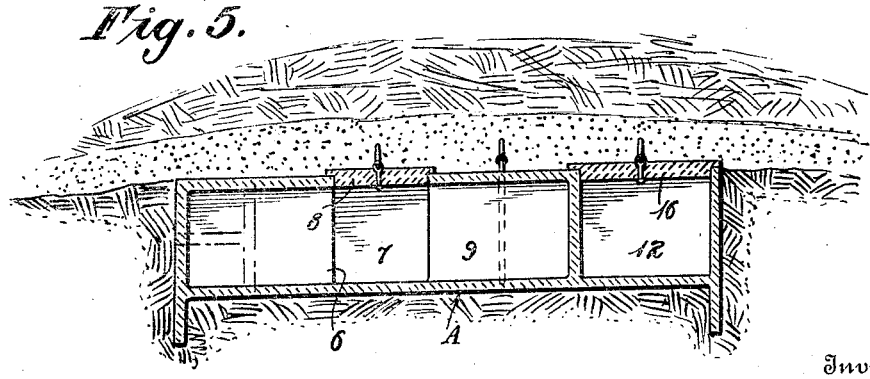

In the accompanying drawings I have shown a preferred embodiment of my invention in which;

Figure 1 is a perspective view of the den shown partly covered with earth. Fig. 2 is a sectional view through the den. Fig. 3 is a section on line 3—3 of Fig. 2. Fig. 4 is a section on line 4—4 of Fig. 2, and Fig. 5 is a section on line 5—5 of Fig. 2.

Referring now more particularly to the drawings wherein like reference characters indicate corresponding parts, the reference character A designates a den which is adapted to be positioned beneath the surface of the earth, preferably in a slight valley and the top of which den is covered by loose earth, sawdust, shrubbery, or the like. The den is positioned so that its compartments cannot become flooded during excessive rains, inasmuch as one end of the den is slightly elevated to cause any incoming water to flow therefrom.

Referring now more particularly to the den, the same is formed with an elongated entrance 1, leading from the surface of the earth or the like, which is preferably of rectangular form. This entrance receives a closing rod 2 having a handle 3 accessible at the entrance of the den, which handle when moved inwardly closes the entrance to the elbow 4 of the den and is locked in this position by a wedging plate 5. The elbow 4 in turn connects with a receptacle formed of wood or the like having arranged therein a plurality of cells by means of the partitions 6. These cells open into a compartment 7 having a removable closure 8 seated thereon. On the opposite side of this compartment 7 there are a series of cells 9 which similarly open into the compartment 7. Leading from the compartment 7 and passing through the receptacle having the compartments 8 there is a passage 10 in which I provide a movable door 11, which passage leads to the elongated compartment 12. This latter compartment as clearly shown has no cells therein has no compartments whatsoever and in this way is distinguished from the compartment herein before mentioned. The elongated compartment is preferably used by the female animals, while the males are generally confined in the different compartments. The trap door 11 may be left open at times if it is desirable to provide an open communication between the compartments in the den or this trap door may be closed whenever preferable.

Leading from the elbow 4 is an exit 12' which contains no door or the like, and which leads to the outhouse 13 surrounded by the walls 14 of the den. The animals confined in the den are permitted to pass into this outhouse whenever they desire for obvious purposes and this outhouse is of considerable size so that the animals are permitted to take substantial exercise therein. The outhouse is, of course, closed by a top or the like and is more in the nature of an open run or range for the animals.

When the animals are to be placed in the den they are admitted thereto through the entrance 1, the rod 3 having been withdrawn to permit the animals to enter the elbow 4 and pass on to the various compartments and the den. They remain therein for any definite period of time and when access is to be had to the den for the purpose of feeding the animals or for removing them the lid or closure 8 of the interposed center compartment 7 is removed or a removable closure or lid 16 placed over the compartment 12. Access may also be had to the outhouse 13 at will without removing the den from its buried or inserted position in the earth. It therefore is apparent that the animals when once in the den remain in there without being molested and that access can be had without disturbing the den.

Having thus described my invention, what I claim is:

1. An animal den having an entrance, a compartment having a series of cells in communication with said entrance, an elongated compartment free of cells and a passage between said compartments and a manually controlled trap door in said passage, in combination with an outhouse at one side of said compartments and in open communication therewith.

2. An animal den having an entrance, a compartment having a series of cells communicating with said entrance, an elongated compartment free of cells and a passage between said compartments, a manually controlled trap door in said passage, in combination with an outhouse at one side of said compartments and in open communication therewith, and removable tops disposed over said cells to permit access to be had thereto without disturbing one of the compartments.

3. An animal den adapted to be positioned beneath the surface of the earth having an elongated entrance, a series of compartments communicating with said entrance, a large zone free of compartments adjacent said series of compartments, a communication between said compartments and said enlarged zone, a movable door in said communication, an outhouse adjacent said compartments, the walls of said den having openings establishing communication between said outhouse and said compartments, and a closure rod for the main entrance adapted to also close the entrance to said outhouse, said den having a removable cover permitting access to be had to the various compartments therein without disturbing the den.

In testimony whereof I affix my signature.

JOHN A. SMITHLINE.